Patented Jan. 19, 1926.

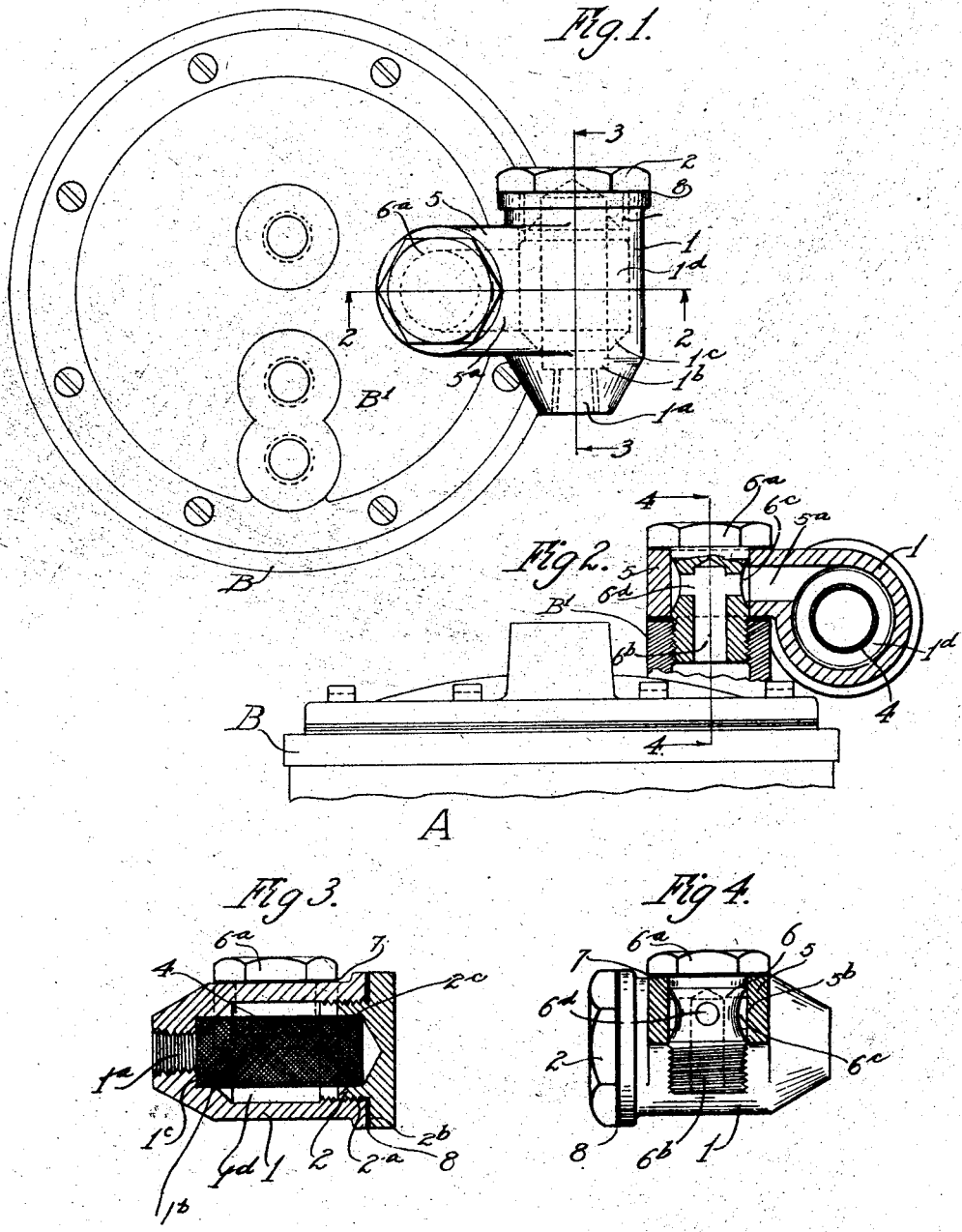

1,570,073

UNITED STATES PATENT OFFICE.

JOHN K. OLSEN, OF CHICAGO, ILLINOIS, ASSIGNOR TO STEWART-WARNER SPEEDOMETER CORPORATION, OF CHICAGO, ILLINOIS, A CORPORATION OF VIRGINIA.

STRAINER FOR VACUUM TANKS.

Application filed September 1, 1922. Serial No. 585,629.

*To all whom it may concern:*

Be it known that I, JOHN K. OLSEN, a citizen of the United States, residing in the city of Chicago, in the county of Cook and the State of Illinois, have invented certain new and useful Improvements in Strainers for Vacuum Tanks, of which the following is a specification, reference being had to the accompanying drawings, forming a part thereof.

The purpose of this invention is to provide a fuel inlet connection for a vacuum tank which constitutes at the same time, or contains, a strainer for separating impurities from the fuel. It consists of the features and elements of construction hereinafter described and shown in the drawings, as indicated in the claims.

In the drawings:—

Figure 1 is a top plan of a vacuum tank equipped with an inlet fitting embodying this invention.

Figure 2 is a detail section through said fitting at line 2—2 on Figure 1.

Figure 3 is a detail section at line 3—3 on Figure 1.

Figure 4 is a section at line 4—4 on Figure 2.

In the construction shown in the drawings A indicates the body of the vacuum tank, B the cap plate or cover thereof, $B^1$ is the fuel inlet nipple protruding upwardly from the cover, B, and is interiorly threaded for connection of the inlet fitting. The inlet fitting embodying this invention comprises a tubular body, 1, having its bore interiorly threaded at one end as shown at $1^a$, for connection with the fuel supply pipe. This body is primarily counterbored at $1^b$, from the end opposite the threaded connection nearly to said threaded end forming a shoulder, $1^c$, and is secondarily counterbored with greater diameter than the first counterbore as seen at $1^e$, to within a short distance of the shoulder, $1^c$. This second counterbore is interiorly threaded at the opposite end for receiving a closure cap, 2, reduced in diameter and threaded at $2^a$, for screwing into the threaded end of the second counter bore leaving a flange, $2^b$, for seating and stopping the cap at the outer end of the body, 1. This closure cap is axially bored at $2^c$, of the diameter of the first counterbore, $1^b$. 4 is a strainer sleeve of such diameter and length as to be seated at its opposite ends in the counter-bore, $1^b$ of the body and the counterbore $2^c$ of the cap and thereby retained in the fitting with an annular space $1^d$ around it. The body, 1, has a laterally positioned transaxially extending stem, 5, which has a duct, $5^a$, leading from the counter bore, $1^e$, stopping short of the end of said stem; and the stem is bored through transversely of said duct and transversely of the axis of the body at $5^b$, the diameter of the bore being substantially the width of the duct, $5^a$. This transverse bore receives a transversely extending swivel stem, 6, having a head, $6^a$, and axially bored from the opposite end at $6^b$, said bore extending entirely across the duct, $5^a$, that is to within a distance of the under side of the head, $6^a$ corresponding to the thickness of the wall of the duct, $5^a$, in the stem, 5, of the body 1. This swivel stem is reduced in diameter by an annular groove, $6^c$, at a zone for registering with the duct, $5^a$, and has a transverse duct, $6^d$, at said zone intersecting the axial duct, $6^b$. The end of the stem, 6, which protrudes from the stem, $5^a$, when said swivel stem, 6, is inserted through the transverse bore, $5^b$, as shown in Figure 2 is threaded for screwing into the inlet connection, $B^1$, packing gaskets 7 and 8 being interposed under the head $6^a$ and above the inlet boss $B^1$ respectively for making a liquid tight junction which will permit swiveling of the body around the swivel stem, 6.

I claim:

1. A fuel inlet fitting for fuel feed tanks comprising a tubular body threaded at one end for pipe connection to a fuel supply pipe, primarily counterbored from the opposite end to form a shoulder near the threaded end and secondarily counterbored to within a short distance of said shoulder and provided with a cap for closing the second counterbore which has a bore at its inner end of the diameter of the first counterbore; a strainer sleeve whose ends are seated in the first counterbore of the body and in the bore of the cap; said body having a lateral outlet from the second counterbore and means for connecting it for discharge through said lateral outlet.

2. In the construction defined in claim 1 foregoing the body having a laterally positioned and transaxially extending stem through which the lateral outlet leads, said stem having a cross bore, and a swivel stem adapted to be inserted through said cross bore of the lateral stem of the body, said swivel stem having an axial passage connected for opening radially of said stem into the duct of the lateral stem of the body, and being threaded at its end protruding through said lateral stem, for connection with the fuel inlet of the vacuum tank.

In testimony whereof I have hereunto set my hand at Chicago, Illinois this 28 day of August, 1922.

JOHN K. OLSEN.